United States Patent [19]

Strecker et al.

[11] Patent Number: 4,490,785
[45] Date of Patent: Dec. 25, 1984

[54] DUAL PATH BUS STRUCTURE FOR COMPUTER INTERCONNECTION

[75] Inventors: William D. Strecker, Harvard; David Thompson, Malden; Richard Casabona, Stow, all of Mass.

[73] Assignee: Digital Equipment Corporation, Maynard, Mass.

[21] Appl. No.: 376,068

[22] Filed: May 7, 1982

[51] Int. Cl.³ .............................................. G06F 1/00
[52] U.S. Cl. ................................................ 364/200
[58] Field of Search ........................ 364/200 MS File

[56] References Cited

U.S. PATENT DOCUMENTS 4,195,351  3/1980  Barner et al. ...................... 364/900
4,228,496 10/1980  Katzman et al. ................... 364/200

OTHER PUBLICATIONS

*Datapro*"Tandem Non-Stop Systems" Jan. 1979, pp. 1-14.
"Introduction to the Tandem-16," Oct. 1976.
"A Systematic Approach to the Design to Digital Bussing Structures" Kenneth J. Herber et al. Fall Joint Computer Conference, 1972, pp. 719-740.

*Primary Examiner*—Raulfe B. Zache
*Attorney, Agent, or Firm*—Cesari & McKenna

[57] ABSTRACT

A bus structure for use in a computer network requiring high availability and reliability of communications. Multiple bus paths (2A, 2B) are provided. When a transmission is to be made, under most circumstances the path is selected at random, with all paths being equally probable. Thus, failure of a path is detected quickly. Each host device in the network connects to the bus paths through an interface, or port (1). The task of path selection is carried out by the ports, independently of the host devices. The ports also detect path failures and automatically switch over to an alternate good path upon detection of such a failure, all without host involvement. Virtual circuit communications between hosts are transparent to path selection and switching, so the only indication to a host device of a path failure is a decrease in throughput. Most of the signal processing apparatus of each port (10, 20A, 20B) is shared by the paths, only one path being supported at any given time. Thus, the addition of a second bus path involves only minimal cost.

8 Claims, 2 Drawing Figures

DUAL PATH BUS STRUCTURE FOR COMPUTER INTERCONNECTION

CROSS REFERENCE TO RELATED APPLICATIONS

The invention which is the subject of this application is particularly useful in a system incorporating one or more of the inventions shown in the following commonly assigned applications, filed on even date herewith.

U.S. Pat. application Ser. No. 376,069, titled INTERFACE FOR SERIAL DATA COMMUNICATIONS LINK, in the names(s) of Robert E. Stewart, Robert Giggi and John E. Buzynski; U.S. Pat. application Ser. No. 375,984, titled METHOD AND APPARATUS FOR DIRECT MEMORY-TO-MEMORY INTERCOMPUTER COMMUNICATION, in the name(s) of William Strecker, Robert Stewart, and Samuel Fuller; and U.S. Pat. application Ser. No. 375,983, titled DUAL-COUNT, ROUND-ROBIN DISTRIBUTED ARBITRATION TECHNIQUE FOR CONTENTION-ARBITRATED SERIAL BUSES, in the name(s) of William D. Strecker, John E. Buzynski, and David Thompson.

To the extent necessary for understanding aspects of the present invention not fully explained herein, if any, and to the extent helpful to a more complete understanding of the utility or advantages of the present invention, the explanations contained in the aforementioned applications are hereby incorporated by reference, as though fully set forth herein.

FIELD OF THE INVENTION

This invention relates to the field computer system interconnections; and, more specifically, to an apparatus for transferring information between different computers or computer system elements in a computer network. It involves the use of not one, but two or more alternate buses or interconnection subsystems to enable the different computers in the network to communicate with one another.

BACKGROUND OF THE INVENTION

In a distributed computer network comprising a system of interconnected computer nodes, information comprising commands, responses and data frequently must be transmitted between two or more nodes and combinations of nodes in order to allow the various components of the network to interact. Generally, a so-called "bus" connects the various nodes and acts as a communications conduit linking them. Obviously, if the bus fails or becomes unavailable, communications between nodes will cease.

A "port", also called an "interface" or "adapter", is the mechanism through which a (host) computer or other device gains access to a bus for communicating with other computers and devices. A port includes a port processor, port buffer, and link components; the roles of these components is explained below.

A "node" comprises a host computer and at least one port; a node may also have or use multiple ports and there ports may communicate with each other over the bus.

A "bus" is an interconnection between devices through which information may be transferred from one device to another; it includes a communication channel and associated components and control.

A "network" is a system of nodes interconnected via a common bus.

For many applications, the consequences of a bus failure are serious, as intercomputer communications are essential; a primary design goal for such networks, therefore, is high bus availability and reliability. One approach which has been adopted in the past to enhance availability and reliability of the node-to-node interconnection in such networks is to provide two fully redundant bus paths running in parallel from node to node. That way, if one path is unavailable the other can be used. Full redundancy, as that term is used herein, implies not only the duplication of cabling between system nodes, but also, at each node and for each port at each node, completely separate processing circuitry and software for handling communications over each of the paths.

Most bus failures however, are not due to unreliability of the transmit or receive processing circuitry or software in a node; but, rather, to physical breakdown of a path—i.e., cabling, connectors, etc. Secondarily, failures occur in the circuitry closest to the cabling—e.g., line drivers and receivers, etc. Consequently, it is needlessly expensive and causes needless complexity to employ full redundancy. Moreover, full redundancy requires that the selection of a path for a particular exchange be made at a point within or very close to the host-interface connection, generally requiring awareness and perhaps even requiring action by the host's software. One way of addressing the burden this creates is to assign one path primary responsiblity, and to use the other path(s) only when the primary path fails. That, however, permits failure of the back-up path(s) to go unnoticed for a long time, until such path(s) is (are) not available when needed, allowing a total failure of communication ability to occur.

Full redundancy also does nothing to protect the integrity of the logical connection between nodes in the event of bus failure.

Accordingly, it is an object of this invention to provide a high availability and high reliability computer interconnection system which is more efficient than a single bus path but less costly than a fully redundant bus system.

It is a further object of this invention to provide such a bus system in which each node contains a minimum of redundant parts dedicated to separate bus paths and a majority of parts shared by multiple bus paths, to provide higher reliability and availability without the cost of a fully redundant dual bus system.

Yet another object of this invention is to provide such an interconnection employing two (or more) bus paths wherein both the selection and operation of the bus path, and the failure of a bus path (with resulting switchover), need not be immediately visible to the host computers which communicate over the system.

Still another object of the invention is to provide a multiple path node interconnection network wherein the failure of a path during an exchange does not corrupt the logical connection between the communicating nodes.

SUMMARY OF THE INVENTION

The foregoing and other objects and advantages of the invention are accomplished by a high speed, high availability and high reliability multiple (e.g., dual) path bus structure wherein separate line drivers and receivers are provided for each bus path but a single set of components (e.g., common transmit and receive logic circuits, etc.) is shared between the two paths. For simplicity, only two bus paths will be shown, it being understood that a greater number may be used in a similar fashion. Both paths are used constantly, with assignment on a random, equal-probability basis, so that a failure is readily found, and is not hidden. Path usage is monitored at each node, in the bus interface, so that a switch-over can be accomplished from one path to the other if a failure occurs or errors are observed on a particular path.

By keeping the path-selection and switching mechanism close to the paths themselves and away from the host-interface connection, path selection is made transparent to the hosts. That is, the hosts need not (and do not) know which bus path is used for a particular transmission.

Transfers from one node to another, as explained more fully in aforementioned application Ser. No. 375,984, titled Method and Apparatus for Direct Memory-to-Memory Intercomputer Communication, incorporated by reference, involve communications from host memory at one node to host memory at another node via, a so called "virtual" circuit. Virtual circuits are set up between the bus interfaces (also called ports) of the nodes, according to node pairs. Virtual circuit state and path state information are integrated into a common place; therefore, path failure is prevented from causing virtual circuit failure. Thus, there is no loss or duplication of transfers as a result of path failure. On failure of a path in mid-transmission, the failed transmission is simply repeated with the same sequence number. It is automatically rerouted over the alternate path and is seen by the receiver as a repeat of a failed transmission, thus avoiding duplicate delivery. That is, the same virtual circuit is continued over the alternate path.

Multiple bus paths are provided primarily to enhance reliability of inter-node communications—i.e., such that single component, node or interface failure will not totally prevent communications between other functioning nodes and ports. As an added benefit obtained at almost no cost, information throughput may be increased about fifty percent as compared with a single bus path. Of course, upon failure of a path, that performance may be degraded until repairs are made.

Each interface is responsible for the multiplexing and demultiplexing of packets on the paths. As explained in aforesaid application Ser. No. 375,984, incorporated by reference herein, each interface includes a port processor, packet buffers and a "link" (or data link). Only the data link portion of the interface need be logically duplicated for each path.

Two types of path selection for transmission are provided. These are designated "Select" and "Automatic." In Select mode, a host can specify a particular path. This mode is used for controller configuration transactions and requires that packets be returned on the same path in response to a request packet, it is also useful for diagnostic purposes. The majority of packets, however, are sent in Automatic mode. In this mode, the selection of the path for transmission of a packet is made by a two-way equally probable, statistical choice (i.e., a "coin-flip"). This results in frequent exercising of both paths, for early failure detection. If a transmission fails, all retransmission attempts for the same packet are made on the same bus path until preestablished retry limits are reached. At that point, the other path can be tried, following the same retransmission algorithms until its retry limits are exceeded. At that point, it is most likely that a hardware failure has occurred or that the destination interface is not in a state where communications are enabled.

Each port maintains a table of path status between itself and all other ports in the network. Such a table indicates whether a path to a given port is correctly functioning or not. The table values are based on prior transmission results. In Automatic mode, paths are selected from only known good paths as indicated in the path status table. This prevents known bad paths from being selected with any great frequency, since such selections would result in failed transmissions and a consequestial waste of available bandwidth. If a known bad path is to be retried, to see if it has been repaired, it is selected with much lower frequency than normal.

This invention is pointed out with particularity in the appended claims. The above and further objects and advantages of this invention may be further understood by referring to the following description of an embodiment taken in conjunction with the accompanying drawings.

DESCRIPTION OF AN ILLUSTRATIVE EMBODIMENT

Single path interfaces also may be connected to the network, but are not encouraged. All single path ports must be connect to a predesignated one of the paths, to insure that all nodes in the network may communicate. The danger that arises from the use of too many single-path ports is that path loads (i.e., usage) becomes unequally distributed to an extent that degrades both performance and reliability.

If a sufficient portion of each port is duplicated physically, it may be possible to transmit packets on both paths simultaneously. Due to interdependent retransmissions, the sequence of packet arrivals could be different than the sequence of their delivery to the originating port. To preserve packet sequentiality on a node-to-node basis, which is required, the transmission of a packet to a remote port must be completed in its entirety before another packet for the same destination is delivered to the data link. The receiving port must process the received packets in the order of their real time arrival.

The path selection mode for packet transmission is specified by the value of the Path Select (PS) field of the command. For example, PS=0 may indicate the Automatic mode, PS=1 may indicate the Select mode for path 0, PS=2 may indicate the Select mode for path 1, and PS=3 may be reserved. The path status table is part of the Virtual Circuit Descriptor Table maintained by each port and consists of two bits for each interface pair; there is one bit for each of the two paths to indicate "good" or "bad" status for that path. Note that the path status table may indicate that the same path is good for one destination port and bad for another, since status is kept on a port-pair basis. For further discussion and explanation of the PS field and the Virtual Circuit Descriptor Table, see aforementioned patent application Ser. No. 375,984, incorporated by reference herein.

When a command specifies Automatic mode, the path for each packet of the command is selected individually from the paths marked good in the path status table. If only one of the paths concurrently is marked good, it is used; if both are marked good, one is selected at random.

In Select mode, the table is ignored for the particular transmission but is updated based on the results of the transmission. The status of a path may be changed from bad to good or good to bad by the outcome of the transmission.

At the time of initialization, all path status table entries indicate that all paths are good.

For any interface in the network capable of operating only on a single path, only one bit of the path status table is kept, for the same preselected one of the paths in all cases (so that all parts have at least one path in common). In Automatic mode, that path is used, unless the path status table bit indicates that the path is bad; in the latter case, the command fails since communication is impossible.

Figure 1:
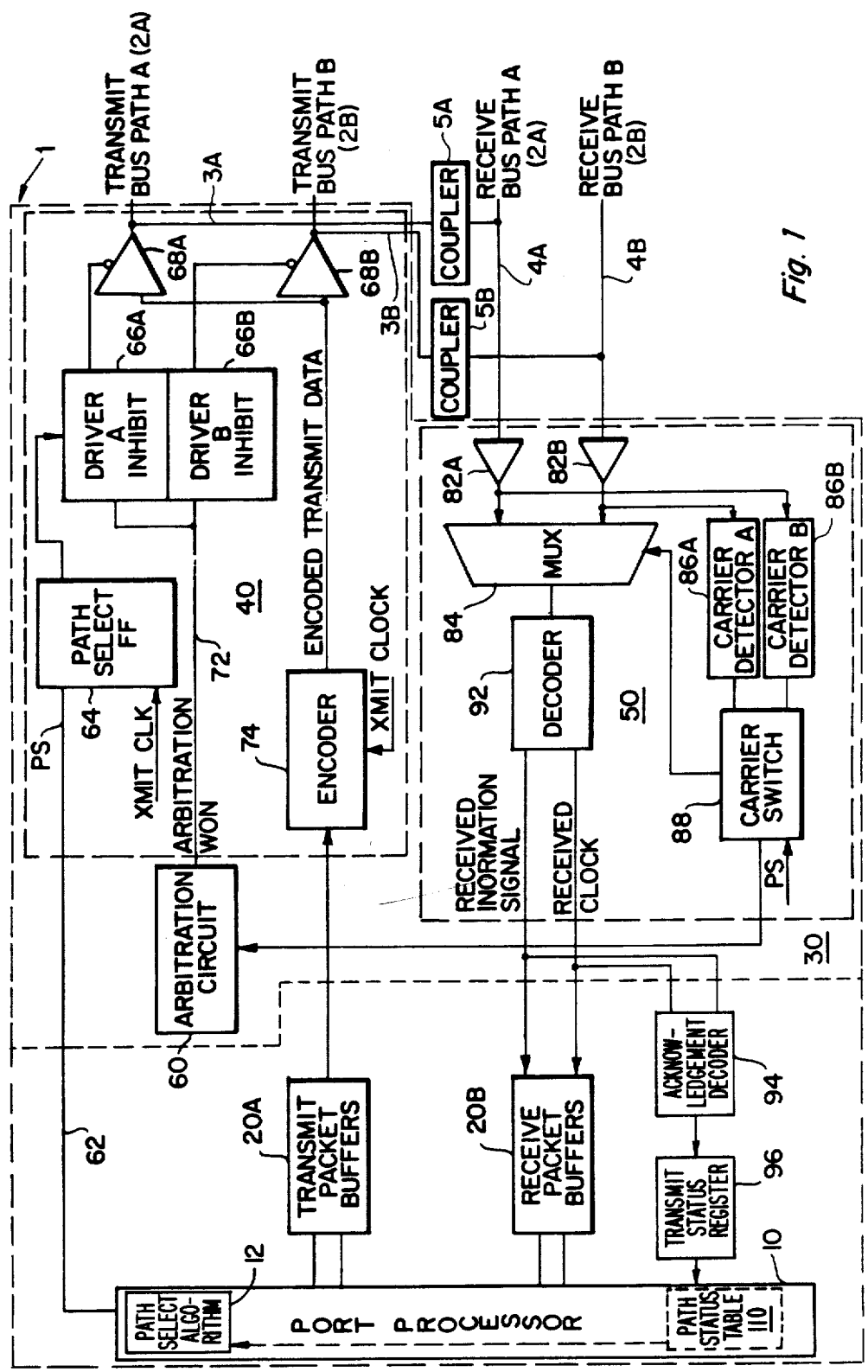
FIG. 1 is a block diagram of a bus interface according to the invention, configured to utilize a pair of bus paths.

Attention is now directed to FIG. 1, where a block diagram of relevant portions of a bus interface (i.e., a port) 1 is shown as it would be configured to utilize two bus paths (2A and 2B), according to the present invention. Each path, such as path 2A, is, in turn, formed from a transmit line 3A and a receive line 4A tied together by a coupler 5A. The port comprises a port processor 10, transmit and receive packet buffers 20A and 20B, and link 30. Link 30, in turn, is divided into three main subassemblies—a transmitter 40, a receiver 50 and an arbitration circuit 60. The latter may physically be implemented in the port processor, but is shown as functionally isolated.

Taking first the transmit operation, port processor 10 supplies a path selection (PS) signal on conductor 62 to a path select flip-flop 64, the latter being clocked by a transmit clock (XMIT CLK) signal. The output of path select flip-flop 64 controls a pair of driver inhibit circuits 66A and 66B, one each for a first bus path (i.e., bus path A) and for a second bus path (i.e., bus path B). The output of the driver inhibit circuits controls the enabling of line drivers 68A and 68B, respectively. When a path is deselected, its line driver is disabled. Driver inhibit circuits 66A respond also to an ARBITRATION WON signal supplied on conductor 72 by arbitration circuit 60. In order for a line driver to be enabled, the associated bus path must be selected by the PS signal and the port must have won arbitration of (i.e., access to) the bus.

Information packets to be transmitted are supplied by transmit packet buffers 20A bit-serially to an encoder 74. The encoder combines the information with a transmit clock, such as by the so-called Manchester encoding technique. Encoded transmit data is supplied by encoder 74 to line drivers 68A and 68B, for transmission by the enabled driver over the selected bus path.

Figure 2:
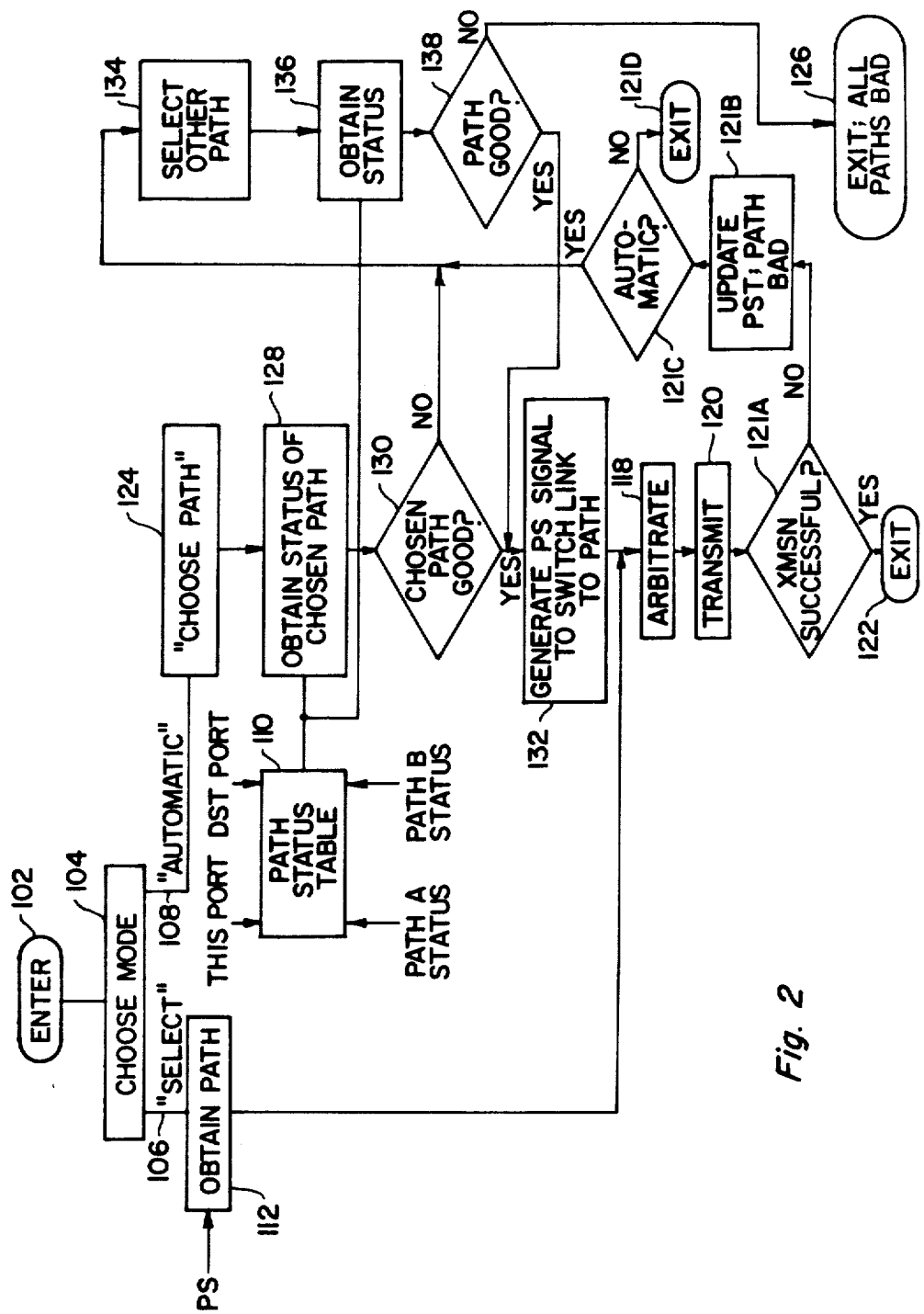
FIG. 2 is a flow chart of the method of selecting a bus path for a transmission, in accordance with this invention.

The PS signal is generated by means fo a path selection algorithm 12 running in port processor 10. The path selection algorithm evaluates the PX field of the transmit command and chooses a path based on that field, a random number generator and the path status entries of path status table 110, which is also maintained in the port processor 10. FIG. 2 provides a more complete understanding of the path selection algorithm.

Turning now to the receiver, signals on bus paths A and B are detected and amplified by an appropriate one of line receivers 82A and 82B, respectively. Each of the line receivers feeds a multiplexer (mux) 84 and a carrier detector, 86A and 86B, respectively. The carrier detectors feed a carrier switch 88 which, in turn, controls mux 84. More specificlly, carrier switch 88 causes mux 84 to select the input corresponding to the appropriate bus path on which a transaction is occurring (i.e., on which a transmit signal—a carrier—is detected). Path switching is done at the beginning of a transmission only, not in the middle. The carrier switch also controls arbitration circuit 60; the latter is described in greater detail in the aforementioned application serial. no. (not yet known), attorney's docket no. 83-300, incorporated by reference herein.

The output of mux 84 is the encoded data transmission received over the selected bus path. A decoder 92, such as described in aforementioned application Ser. No. 376,069, hereby incorporated by reference, separates out the information signal from the clock and supplies these to the receive packet buffers 20B, for serial-to-parallel conversion of the information bytes.

The outputs from decoder 92 also are supplied to an acknowledgment decoder 94. The acknowledgment decoder evaluates the acknowledgment signals received from a destination port and supplies the results to a transmit status register 96. In turn, the transmit status register notifices the port processor 10 whether the transmission was successful or unsuccessful and, if the latter, whether a path was found bad. If a path was found bad, the entry of the path status table is updated to reflect that situation.

The operation of path selection is shown graphically in the flow chart of FIG. 2. Upon receipt of a transmit command, step 102, the process begins. First, the port processor chooses the path-selection mode (step 104)—i.e., Select mode (shown on line 106) or Automatic mode (shown on line 108).

Assuming Select mode was chosen, the selected path is obtained next, step 112. The port next arbitrates for bus access, step 118, and transmits after winning arbitration, step 120. At the conclusion of a transmission (i.e., retries are exhausted or the transmission succeeded, a determination is made whether the transmission was successful, step 121A. If so, the algorithm exits the routine, step 122. If the transmission failed, the path status table is updated to indicate the path is bad, step 121B, and the routine exits, steps 121C and 121D. Note that step 120 retries, if needed. If Automatic mode is selected, the path is chosen as follows (step 124): initially, the path selection is made randomly, on an equal probability basis; on subsequent attempts to select a path due to prior selection of a bad path, the prior bad selection(s) is (are) excluded and a random pick is made from among remaining paths. If all possiblities are exhausted without finding a good path, the procedure exits with an appropriate failure indication, step 126. Following each tentative path selection, the status of the chosen path is obtained from the path status table, step 128, and tested to see whether it is good or bad, step 130. If bad, an attempt is made to find an alternate path (steps 134, 136 and 138); if good, the PS signal is generated, to switch the link to the selected path, (step 132) and arbitration is begun, step 118.

From step 121C or step 130, alternate path selection starts by selecting another path, step 134. The status of this alternate path is obtained from the path status table 110, step 136, and checked to see whether the path is good, step 138. If the alternate path is good, control branches to step 132; otherwise, the routine exits with an indication that all paths are bad, step 126.

Thus, there is no host involvement necessary in making a path selection or switchover, both paths are exercised frequently, and minimal hardware is needed to add the second bus path. It is a simple matter to extend these concepts to more than two paths, of course. The main change would be to add a decision block in FIG. 2 between the "No" output of step 138 and the exit, step 126, to loop back to step 134 if all paths have not been tried. The path status table would also have to be enlarged.

The foregoing description is limited to a single specific embodiment of this invention, but it will be apparent that this invention can be practiced in data processing systems having diverse basic construction or in systems using different internal circuitry or design while nevertheless achieving some or all of the foregoing objects and advantages of this invention. Therefore, it is the object of the appended claims to cover all such variations, modifications and obvious improvement as come within the true spirit and scope of this invention.

What is claimed as new and desired to be secured by Letters Patent of the United States is:

1. A high reliability and high availability bus structure for providing communications between the nodes of a computer network, wherein each node includes a host device and at least one port, the port being an interface for connecting the host device to the bus, the bus structure comprising:
   A. the bus including at least a first bus path (2A) and a second bus path (2B), said bus paths being independent of each other; and
   B. for each port (1)
      i. transmitting means (68A, 68B) for transmitting signals onto each of the bus paths,
      ii. receiving means (82A, 82B) for receiving signals from each of the bus paths,
      iii. path selecting means (e.g., port processor 10) responsive to a signal from the host device which indicates that the host device desires to transmit, for selecting one of said bus paths for use for transmission,
      iv. means (64, 66A, 66B) coupled to the path selecting means for enabling the transmitting means to transmit only on the selected path,
      v. carrier detect means (86A, 86B) coupled to the receiving means for detecting the presence or absence of signals on each bus path and the beginning of a transmission, and
      vi. means (88, 84) responsive to the carrier detect means for selecting only one of the paths for receive signal processing responsive to the presence of signals thereon at the beginning of a transmission.

2. The apparatus of claim 1 wherein the path selecting means (10) is adapted to select a bus path at random, on an equal probability basis, at least a substantial part of the time, whereby all bus paths are exercised frequently, as a result of which, failure of any bus path will be detected promptly and most probably prior to the occurrence of multiple path failures and both paths may be used simultaneously by different pairs of ports, for increased information throughput relative to a single bus path.

3. The apparatus of claim 1 or claim 2 wherein the means responsive to the carrier detect means includes
   (a) a multiplexer (84) for receiving as inputs the received signals detected by the receiving means (82A, 82B) and for providing as its output one of those signals at a time, responsive to a multiplexer control signal, for subsequent processing by the port; and
   (b) carrier switch means (88) for providing the multiplexer control signal, the provision of such signal being responsive to the carrier detect means and the path select means, whereby a minimum of redundant parts are employed for processing received signals from multiple buses.

4. The apparatus of claim 3 wherein the multiplexer control signal is provided to cause the multiplexer to select a bus path at the beginning of a transmission only.

5. In a network for providing communications between multiple computer nodes, and wherein all communications take place via virtual circuits created between pairs of ports, a high reliability and high availability bus structure for interconnecting said ports, comprising:
   A. the bus including at least a first bus path (2A) and a second bus path (2B), said bus paths being independent of each other; and
   B. at each port (1)
      i. a path status table (110) maintained by the port and containing, for each other port in the network, an indication of virtual circuit state between itself and said other port and an indication of the state of each bus path, and
      ii. means (12) for selecting a bus path for a transmission to another port, responsive to the path states shown in the path status table, whereby virtual circuit state is undisturbed by failure of a bus path if the status of at least one path is good after the failure, so that upon occurrence of such a failure, the means for selecting a bus path chooses a new path and communications continue without the hosts having to know about or take action regarding the failure and the path switchover.

6. The bus structure of claim 5 further including means (10) for altering the path state, indications of the path status table (110) responsive to the results of transmissions.

7. The bus structure of claim 5 or claim 6 further including means (10) for altering the virtual circuit indications in the path status table (110) responsive to a transmission failing because all paths are bad and unusable.

8. The bus structure of claim 7 wherein the means for selecting a bus path is adapted to select a bus path randomly from among the available bus paths whose status is shown as good in the path status table.

* * * * *